(12) United States Patent
Ohori et al.

(10) Patent No.: US 12,224,638 B2
(45) Date of Patent: Feb. 11, 2025

(54) INSULATOR, STATOR, AND ELECTRIC MOTOR

(71) Applicant: MITSUBA Corporation, Gunma (JP)

(72) Inventors: Ryo Ohori, Gunma (JP); Minori Shoda, Gunma (JP); Yuzu Isomura, Gunma (JP)

(73) Assignee: MITSUBA Corporation, Gunma (JP)

( * ) Notice: Subject to any disclaimer, the term of this patent is extended or adjusted under 35 U.S.C. 154(b) by 208 days.

(21) Appl. No.: 17/994,396

(22) Filed: Nov. 28, 2022

(65) Prior Publication Data

US 2023/0253848 A1 Aug. 10, 2023

(30) Foreign Application Priority Data

Feb. 9, 2022 (JP) .................................. 2022-018727

(51) Int. Cl.
*H02K 3/34* (2006.01)
*H02K 1/16* (2006.01)

(52) U.S. Cl.
CPC ............ *H02K 3/345* (2013.01); *H02K 1/165* (2013.01); *H02K 2213/03* (2013.01)

(58) Field of Classification Search
CPC ..... H02K 3/345; H02K 1/165; H02K 2213/03
See application file for complete search history.

(56) References Cited

U.S. PATENT DOCUMENTS 11,616,411 B2 * 3/2023 Bailey .................... H02K 1/165
310/216.115

FOREIGN PATENT DOCUMENTS

JP 2018007427 1/2018
JP 2021035176 * 3/2021 ............... H02K 3/34

* cited by examiner

*Primary Examiner* — Terrance L Kenerly
(74) *Attorney, Agent, or Firm* — JCIPRNET

(57) ABSTRACT

An insulator, a stator, and an electric motor capable of improving molding accuracy and assemblability are provided. An insulator 26 includes a first insulator 61 and a second insulator 62 to be attached from both axial sides of a stator core. The first insulator 61 has a first core end surface covering portion 65 and a first skirt portion 79. The second insulator 62 has a second core end surface covering portion 265 and a second skirt portion 279. The insulator 26 includes a coil lead-out portion 77 provided integrally with only the first core end surface covering portion 65 for leading out terminal portions of coils from the first insulator 61 to the outside. A length of the longest portion of the second skirt portion 279 in the axial direction is greater than a length of the longest portion of the first skirt portion 79 in the axial direction.

11 Claims, 11 Drawing Sheets

INSULATOR, STATOR, AND ELECTRIC MOTOR

CROSS-REFERENCE TO RELATED APPLICATION

This application claims the priority benefits of Japanese application no. 2022-018727, filed on Feb. 9, 2022. The entirety of the above-mentioned patent application is hereby incorporated by reference herein and made a part of this specification.

BACKGROUND

Technical Field

The disclosure relates to an insulator, a stator, and an electric motor.

Description of Related Art

An electric motor includes, for example, a stator which is wound with a coil, and a rotor which is provided rotatably with respect to the stator and has a permanent magnet. The stator is made of a magnetic material, and has an annular core body and teeth that protrude from the core body along the radial direction. Coils are wound around the teeth from above an insulator. The insulator is made of insulating resin. The insulator provides insulation between the teeth and the coils. Under such a configuration, when the coils are energized, a magnetic field is formed in the teeth. Magnetic attractive force and repulsive force are generated between this magnetic field and the permanent magnet to rotate the rotor continuously.

Here, in many cases, the insulator is split in the axial direction so as to surround the periphery of the teeth and are attached from both axial sides of the core body. One of the two split insulators is integrally molded with a coil lead-out portion (pillar, claw) for leading out the coils from the insulator in order to gather and electrically connect the terminal portions of the coils to an external power supply.

However, in the conventional technology described above, the insulator integrally molded with the coil lead-out portion has a complicated shape, and thus there is a problem that the molding accuracy may deteriorate. Besides, the deformation of the insulator after molding may become large. For this reason, there is a problem that the deformation of the insulator after molding may cause the assemblability of the insulator to deteriorate.

The disclosure provides an insulator, a stator, and an electric motor capable of improving the molding accuracy and assemblability.

SUMMARY

An insulator according to the disclosure is made of resin and is attached to a stator core, which includes an annular core body and a plurality of teeth protruding from the core body along a radial direction, for providing insulation between the stator core and coils wound around the teeth. The insulator includes a first insulator and a second insulator to be attached from both axial sides of the stator core. The first insulator includes: a first core end surface covering portion covering a first end surface of the core body in an axial direction; and a first skirt portion extending in the axial direction from the first core end surface covering portion toward the second insulator and covering a peripheral surface of the core body and circumferential side surfaces of the teeth. The second insulator includes: a second core end surface covering portion covering a second end surface of the core body opposite to the first end surface in the axial direction; and a second skirt portion extending in the axial direction from the second core end surface covering portion toward the first insulator and covering the peripheral surface of the core body and the circumferential side surfaces of the teeth. The insulator includes a coil lead-out portion provided integrally only with the first core end surface covering portion for leading out terminal portions of the coils from the first insulator to outside, and a length of a longest portion of the second skirt portion in the axial direction is greater than a length of a longest portion of the first skirt portion in the axial direction.

According to the disclosure, the molding accuracy and assemblability of the insulator, the stator, and the electric motor can be improved.

DESCRIPTION OF THE EMBODIMENTS

Next, embodiments of the disclosure will be described based on the drawings.

<Motor with Speed Reducer>

Figure 1:
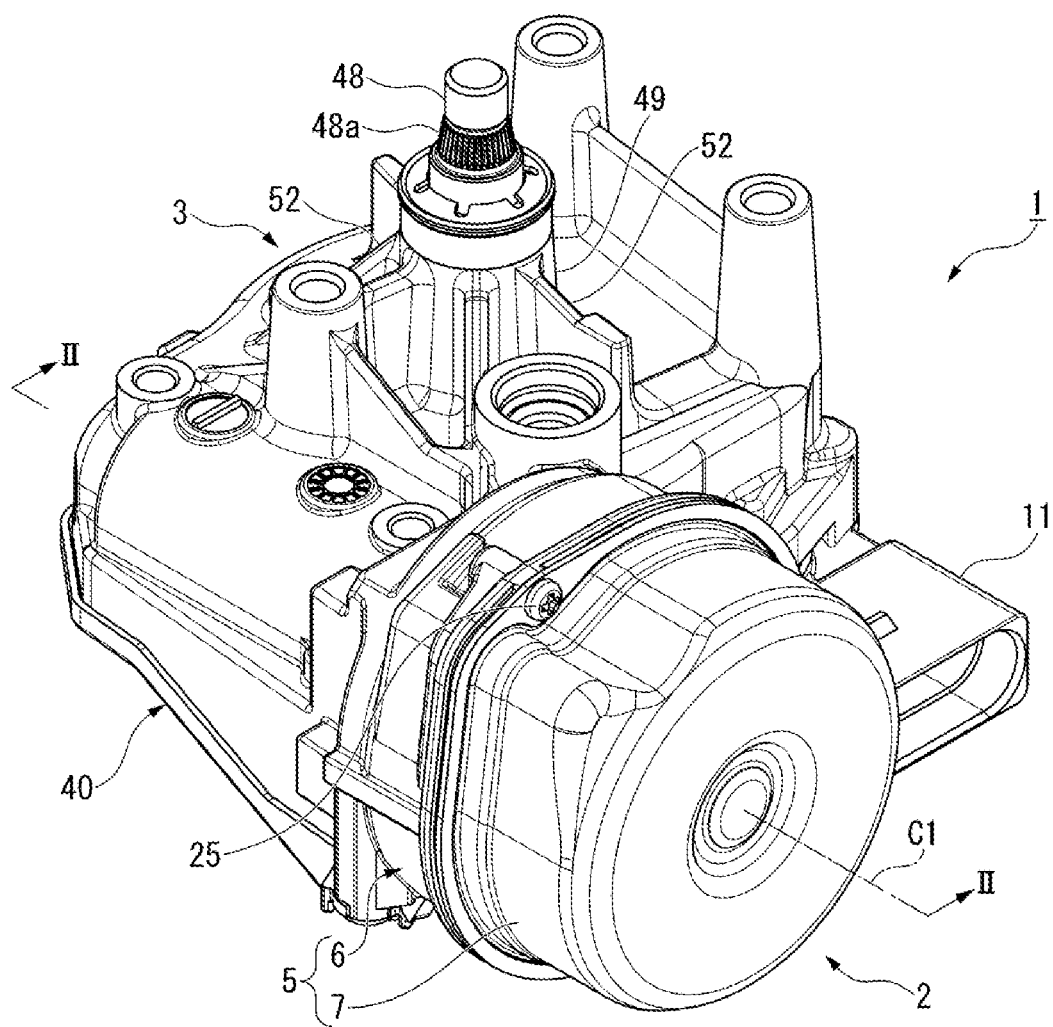
FIG. 1 is a perspective view of a motor with a speed reducer according to an embodiment of the disclosure.
Figure 2:
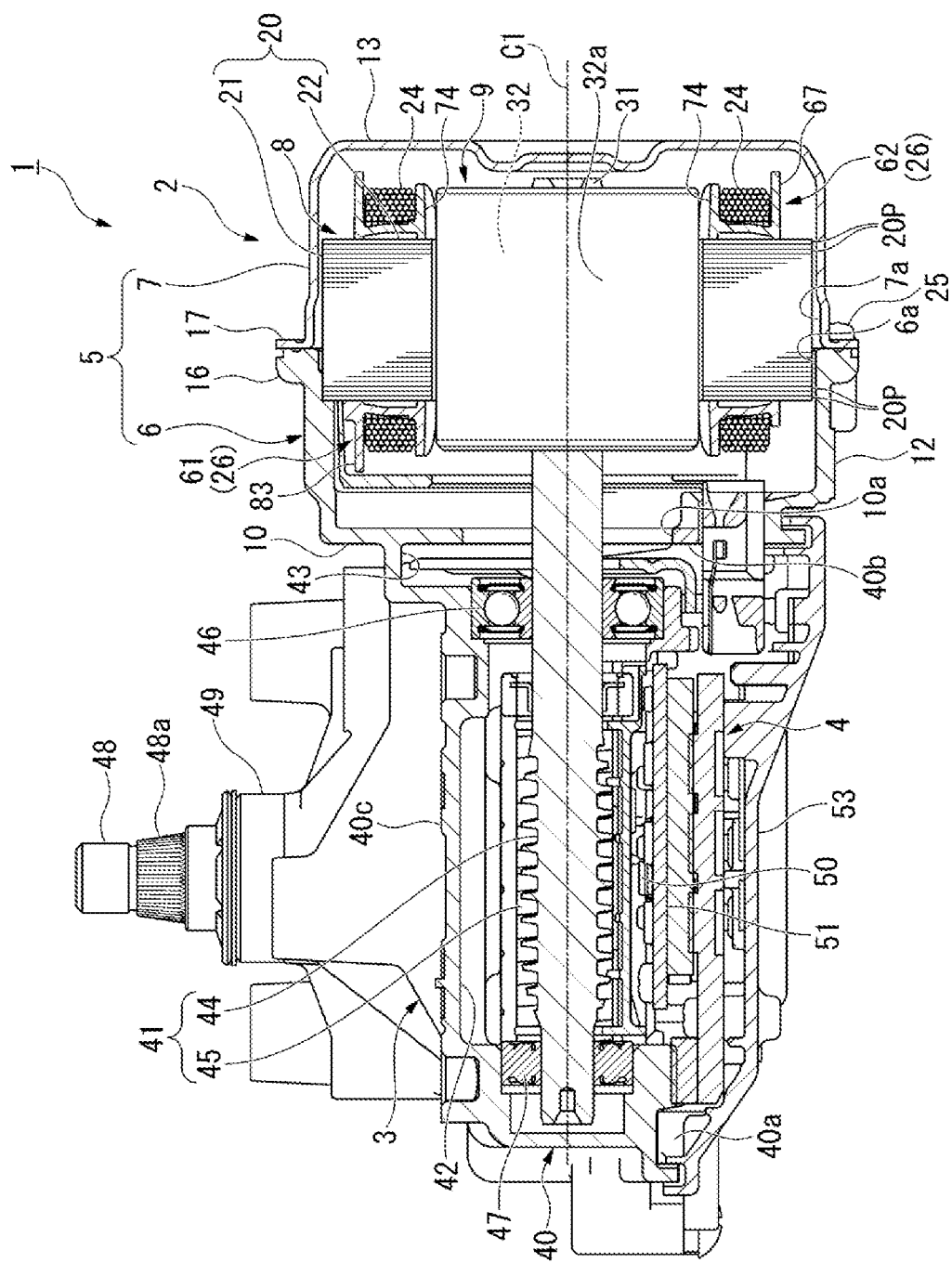
FIG. 2 is a cross-sectional view taken along the line II-II of FIG. 1.

FIG. 1 is a perspective view of a motor 1 with a speed reducer. FIG. 2 is a cross-sectional view taken along the line II-II of FIG. 1. The motor 1 with the speed reducer is used, for example, as the drive source for a wiper device of a vehicle. As shown in FIG. 1 and FIG. 2, the motor 1 with the speed reducer includes an electric motor 2, a deceleration part 3 that decelerates and outputs the rotation of the electric motor 2, and a controller 4 that controls the driving of the electric motor 2. In the following description, the term "axial direction" simply means a direction parallel to the central axis of a shaft 31 of the electric motor 2 (rotation axis C1 of the electric motor 2). The term "circumferential direction" simply means the circumferential direction (rotational direction) of the shaft 31. The term "radial direction" simply means the radial direction of the shaft 31 orthogonal to the axial direction and the circumferential direction.

<Electric Motor>

The electric motor 2 includes a motor case 5, a cylindrical stator 8 that is accommodated in the motor case 5, and a rotor 9 that is arranged on the radial inner side of the stator 8 and is provided rotatably with respect to the stator 8. The electric motor 2 is a so-called brushless motor which does not require brushes when supplying power to the stator 8.

<Motor Case>

The motor case 5 is made of a material such as an aluminum alloy having excellent heat dissipation properties. The motor case 5 is composed of a first motor case 6 and a second motor case 7 which are configured to be separable in the axial direction. The first motor case 6 and the second motor case 7 are each formed in a cylindrical shape with a bottom.

A bottom portion 10 of the first motor case 6 is molded integrally with a gear case 40 of the deceleration part 3. A through hole 10a through which the shaft 31 of the electric motor 2 can be inserted is formed in the radial center of the bottom portion 10. Openings 6a and 7a of the first motor case 6 and the second motor case 7 are respectively formed with outer flange portions 16 and 17 that project toward the radial outer side. These outer flange portions 16 and 17 are butted against each other, and the first motor case 6 and the second motor case 7 are integrated with a bolt 25. The motor case 5 has an internal space closed by the first motor case 6 and the second motor case 7, and the stator 8 and the rotor 9 are accommodated in this internal space.

<Rotor>

The rotor 9 is arranged rotatably on the radial inner side of the stator 8 with a minute gap therebetween. The rotor 9 includes the shaft 31, a cylindrical rotor core 32 that is fitted and fixed to the shaft 31, a plurality of magnets (not shown) that are assembled to the outer peripheral portion of the rotor core 32, and a magnet cover 32a that covers the rotor core 32 from above the magnets.

The shaft 31 is formed integrally with a worm shaft 44 that constitutes the deceleration part 3. However, the worm shaft 44 is not limited thereto, and the worm shaft 44 may be formed separately from the shaft 31 and connected to an end portion of the shaft 31. The shaft 31 and the worm shaft 44 are rotatably supported by the gear case 40 via bearings 46 and 47. The shaft 31 and the worm shaft 44 rotate around the rotation axis C1. A ferrite magnet, for example, is used as the magnet. However, the magnet is not limited thereto, and a neodymium bond magnet, a neodymium sintered magnet, or the like can be applied as the magnet.

<Deceleration Part>

The deceleration part 3 includes the gear case 40 that is integrated with the motor case 5, and a worm reduction mechanism 41 that is accommodated in the gear case 40. The gear case 40 is made of a metal material such as an aluminum alloy having excellent heat dissipation properties. The gear case 40 is formed in a box shape having an opening 40a on one surface. The gear case 40 has a gear housing portion 42 that houses the worm reduction mechanism 41 inside. Further, a side wall 40b of the gear case 40 is formed with an opening 43 that communicates the gear housing portion 42 with the through hole 10a of the first motor case 6 at the portion where the first motor case 6 is integrally formed.

A cylindrical bearing boss 49 is formed to protrude from a bottom wall 40c of the gear case 40. The bearing boss 49 is for rotatably supporting an output shaft 48 of the worm reduction mechanism 41, and a slide bearing (not shown) is arranged on the inner peripheral side. An O-ring (not shown) is attached to the inner peripheral surface at the tip portion of the bearing boss 49. In addition, a plurality of ribs 52 for ensuring rigidity are protruded from the outer peripheral surface of the bearing boss 49.

The worm reduction mechanism 41 housed in the gear housing portion 42 is configured with the worm shaft 44 that is integrally formed with the shaft 31 of the rotor 9, and a worm wheel 45 that meshes with the worm shaft 44. Both end portions of the worm shaft 44 in the axial direction are supported by the gear case 40 via the bearings 46 and 47 to be rotatable around the rotation axis C1. The output shaft 48 of the electric motor 2 is provided coaxially and integrally with the worm wheel 45. The worm wheel 45 and the output shaft 48 are arranged such that the rotation axes thereof are orthogonal to the rotation axis C1 of the worm shaft 44 (the shaft 31 of the electric motor 2). The output shaft 48 protrudes outside via the bearing boss 49 of the gear case 40. A protruding tip of the output shaft 48 is formed with a spline 48a that can be connected to an object to be driven by the motor.

In addition, the worm wheel 45 is provided with a sensor magnet (not shown). The position of this sensor magnet is detected by a magnetic detection element 50 (which will be described later) provided in the controller 4. In other words, the rotational position of the worm wheel 45 is detected by the magnetic detection element 50 of the controller 4.

<Controller>

The controller 4 has a controller board 51 on which the magnetic detection element 50 is mounted. The controller board 51 is arranged in the opening 40a of the gear case 40 such that the magnetic detection element 50 faces the sensor magnet of the worm wheel 45. The opening 40a of the gear case 40 is closed with a cover 53.

The controller board 51 is electrically connected to coils 24 (which will be described later) of the stator 8. Terminals of a connector 11 (see FIG. 1) provided on the cover 53 are electrically connected to the controller board 51. In addition to the magnetic detection element 50, a power module (not shown) composed of switching elements such as FETs (Field Effect Transistors) for controlling the drive voltage supplied to the coils 24, a capacitor (not shown) for smoothing the voltage, etc. are mounted on the controller board 51.

<Stator and Terminal Holder>

Figure 3:
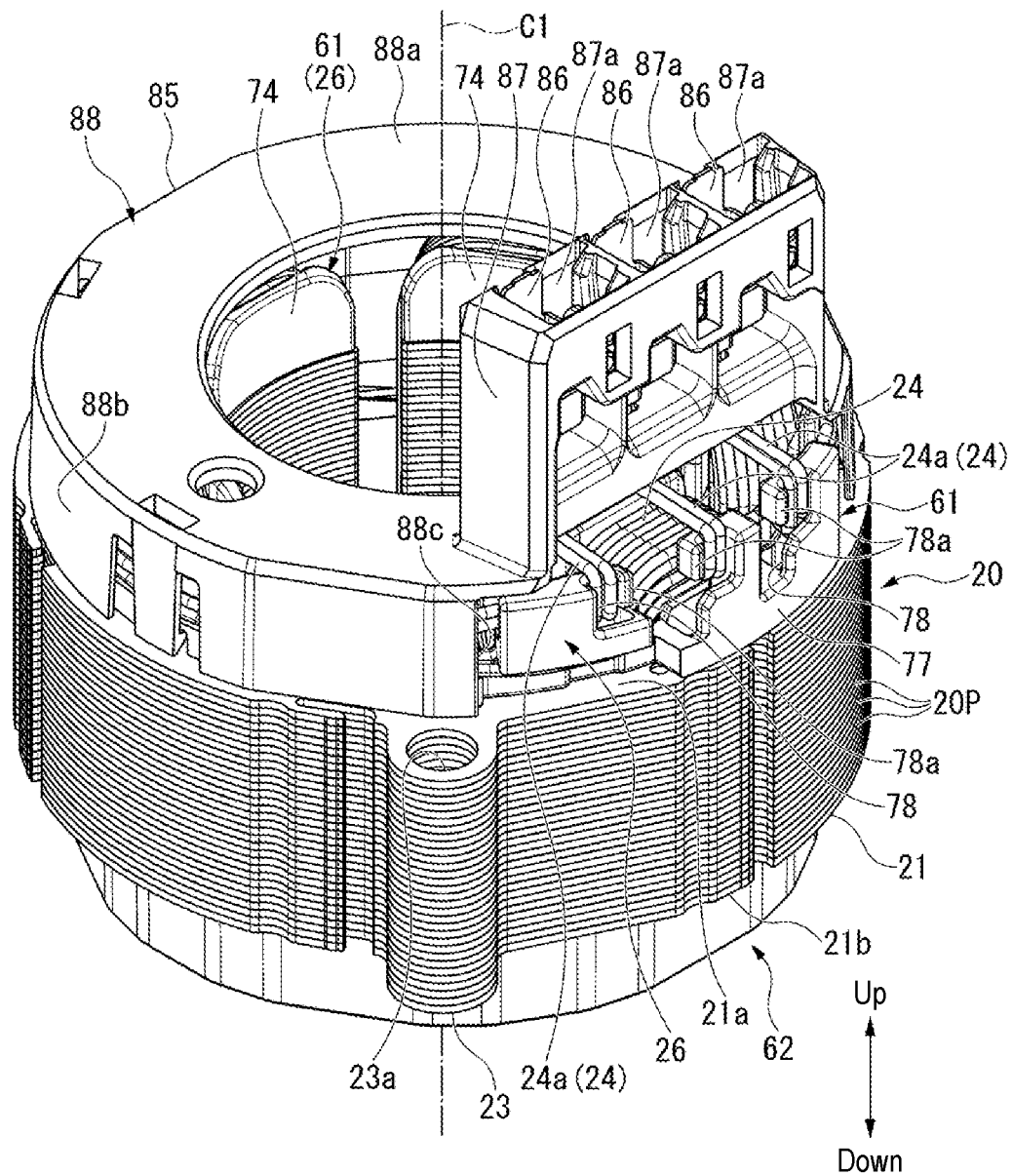
FIG. 3 is a perspective view of a stator according to an embodiment of the disclosure.
Figure 4:
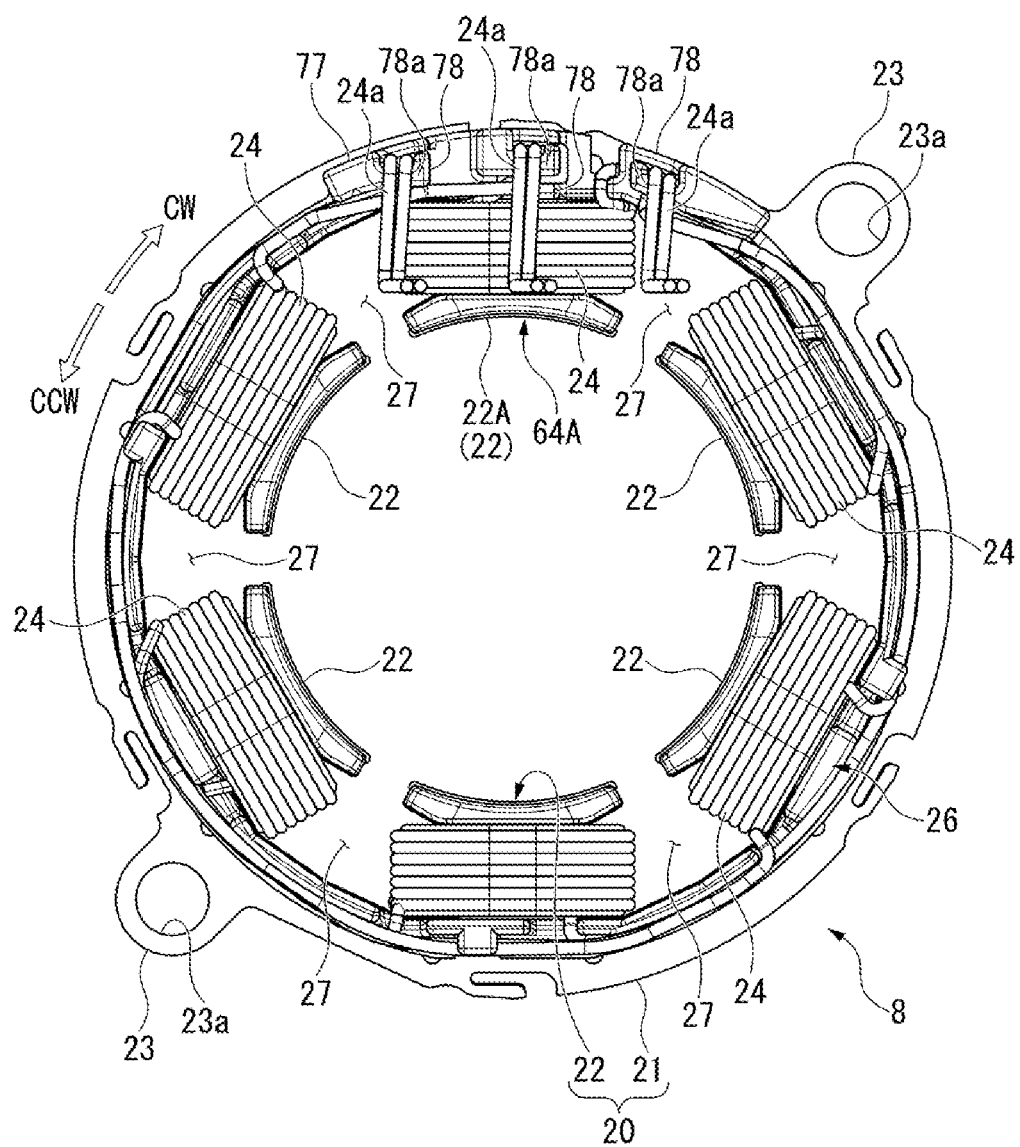
FIG. 4 is a plan view of the stator according to an embodiment of the disclosure, as viewed from the axial direction, and shows a state where a terminal holder is removed.

FIG. 3 is a perspective view of the stator 8. FIG. 4 is a plan view of the stator 8 as viewed from the axial direction, and shows a state where a terminal holder 85 is removed. As shown in FIG. 3 and FIG. 4, the stator 8 includes a cylindrical stator core 20 whose central axis coincides with the rotation axis C1, an insulator 26 attached to the stator core 20, and a plurality of coils 24 having a three-phase (U-phase, V-phase, and W-phase) structure wound around the stator core 20 from above the insulator 26.

The terminal holder 85 is provided on the stator core 20. The terminal holder 85 includes terminals 86, a holder body 87 that holds the terminals 86, and a cover portion 88 that covers one axial end portion of the stator core 20, which are integrally molded. The terminals 86 are connected to terminal portions 24a of the coils 24 of respective phases and to the connector (not shown) extending from the controller board 51. The cover portion 88 includes an annular end surface cover portion 88a that is arranged to face the stator core 20 in the axial direction, and an outer peripheral cover portion 88b that extends from the outer peripheral edge of the end surface cover portion 88a toward the side of the stator core 20 and covers the insulator 26 from the radial outer side, which are integrally molded.

The holder body 87 is formed to rise from a portion of the end surface cover portion 88a toward the side opposite to the stator core 20. A cut-out portion 88c in a cut-out form is formed at a portion of the end surface cover portion 88a and the outer peripheral cover portion 88b corresponding to the holder body 87. The holder body 87 is formed in a rectangular parallelepiped shape that is long in the axial direction and the circumferential direction. The connector (not shown) extending from the controller board 51 is attached to the holder body 87. The holder body 87 is formed with three terminal accommodating concave portions 87a arranged side by side in the longitudinal direction, as viewed from the axial direction. The terminals 86 are accommodated and held in these terminal accommodating concave portions 87a. Then, the terminals 86 and the connector (not shown) extending from the controller board 51 are connected.

Figure 5:
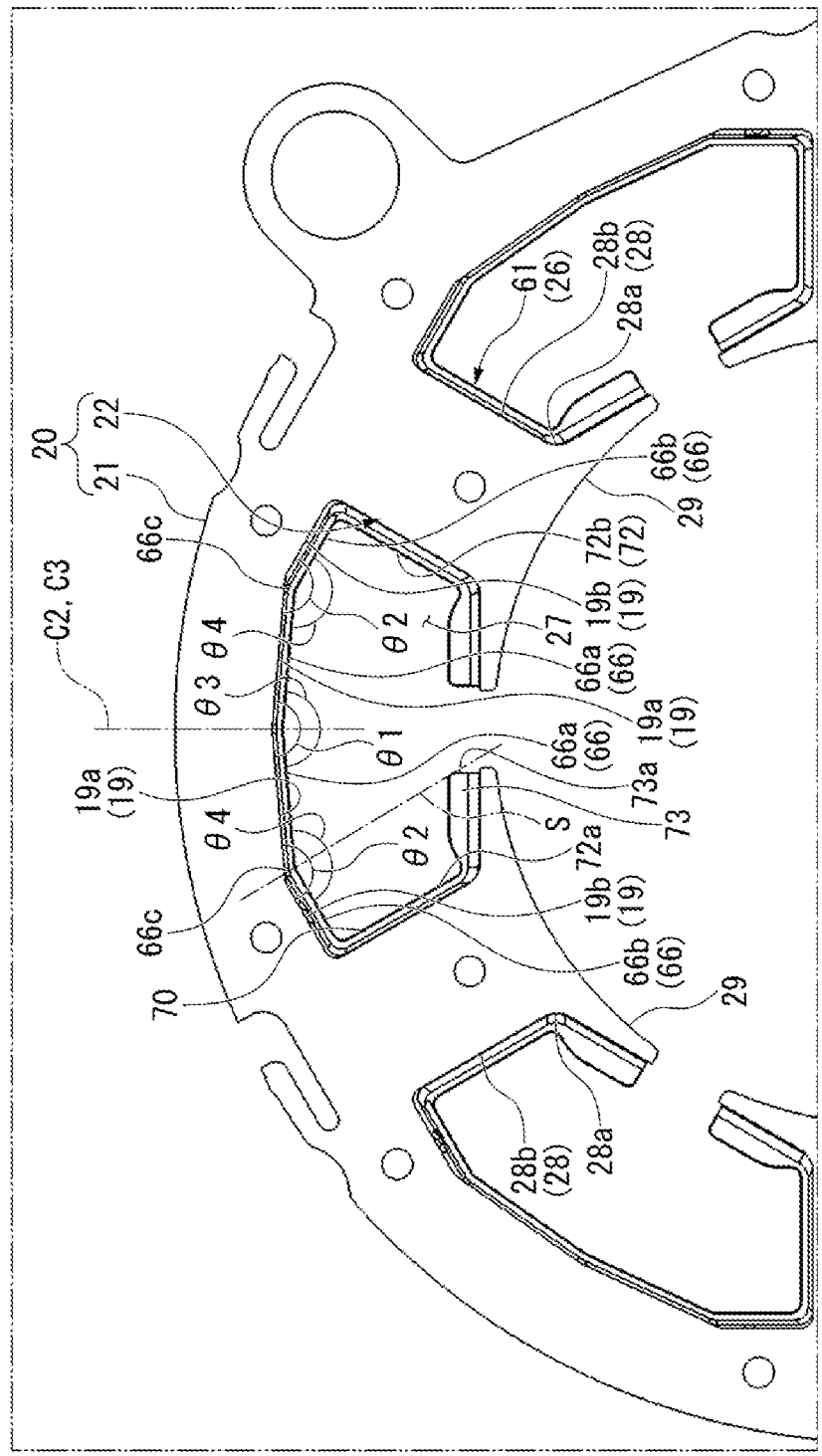
FIG. 5 is a partially enlarged plan view of a stator core according to the first embodiment of the disclosure, as viewed from the axial direction.

FIG. 5 is a partially enlarged plan view of the stator core 20, as viewed from the axial direction. FIG. 5 shows only the first insulator 61, which will be described later, among the insulator 26 attached to the stator core 20. Further, in FIG. 5, the stator core 20 is viewed from the side of the second insulator 62, which will be described later, among the insulator 26. As shown in FIG. 3 to FIG. 5, the stator core 20 is formed by laminating a plurality of electromagnetic steel plates 20p. However, the stator core 20 is not limited thereto, and the stator core 20 may be formed by, for example, pressure-molding soft magnetic powder.

The stator core 20 includes a cylindrical core body 21, a plurality of (six in the first embodiment) teeth 22 that protrude from an inner peripheral surface 19 of the core body 21 toward the radial inner side, and two fixing portions 23 that are integrally molded on the outer peripheral surface of the core body 21. The inner peripheral surface 19 of the core body 21 is in a slightly polygonal shape rather than an arc shape. That is, the inner peripheral surface 19 of the core body 21 has two first peripheral surfaces 19a that extend from a circumferential center C2 between the teeth 22 adjacent in the circumferential direction toward the teeth 22, and two second peripheral surfaces 19b that further extend from the first peripheral surfaces 19a toward the teeth 22 and are connected to the roots of the teeth 22. The angle θ1 between the two first peripheral surfaces 19a is greater than the angle θ2 between the first peripheral surface 19a and the second peripheral surface 19b.

The tooth 22 includes a tooth body 28 that protrudes from the inner peripheral surface 19 of the core body 21 along the radial direction, and a flange portion 29 that is integrally molded with a tooth tip portion 28a, which is the radial inner end of the tooth body 28 on the side opposite to the core body 21. Two circumferential side surfaces 28b of the tooth body 28 are parallel to each other and are parallel to the radial direction. The coil 24 is wound around the tooth body 28 from above the insulator 26.

The flange portion 29 extends along the circumferential direction. The inner peripheral surface of the flange portion 29 is formed along a circle centered on the rotation axis C1. Between the teeth 22 adjacent in the circumferential direction, a dovetail groove-like slot 27, as viewed from the axial direction, is formed by the inner peripheral surface of the core body 21, the circumferential side surfaces 28b of the tooth bodies 28, and the outer peripheral surfaces of the flange portions 29.

The fixing portions 23 protrude from the outer peripheral surface of the core body 21 toward the radial outer side and are arranged at intervals of 180° in the circumferential direction. A bolt insertion hole 23a is formed in the fixing portion 23 to penetrate in the axial direction.

With such a configuration, the outer peripheral surface of the core body 21 is fitted to the inner peripheral surface of the first motor case 6 and accommodated. Then, by inserting a tapping screw (not shown) into the bolt insertion hole 23a of the fixing portion 23 and screwing the tapping screw into the bottom portion 10 of the first motor case 6, the stator core 20 is fastened and fixed to the first motor case 6. The second motor case 7 is covered from above the stator core 20 fixed in this way. Then, the second motor case 7 is fixed to the first motor case 6.

First Embodiment

<Insulator>

Figure 6:
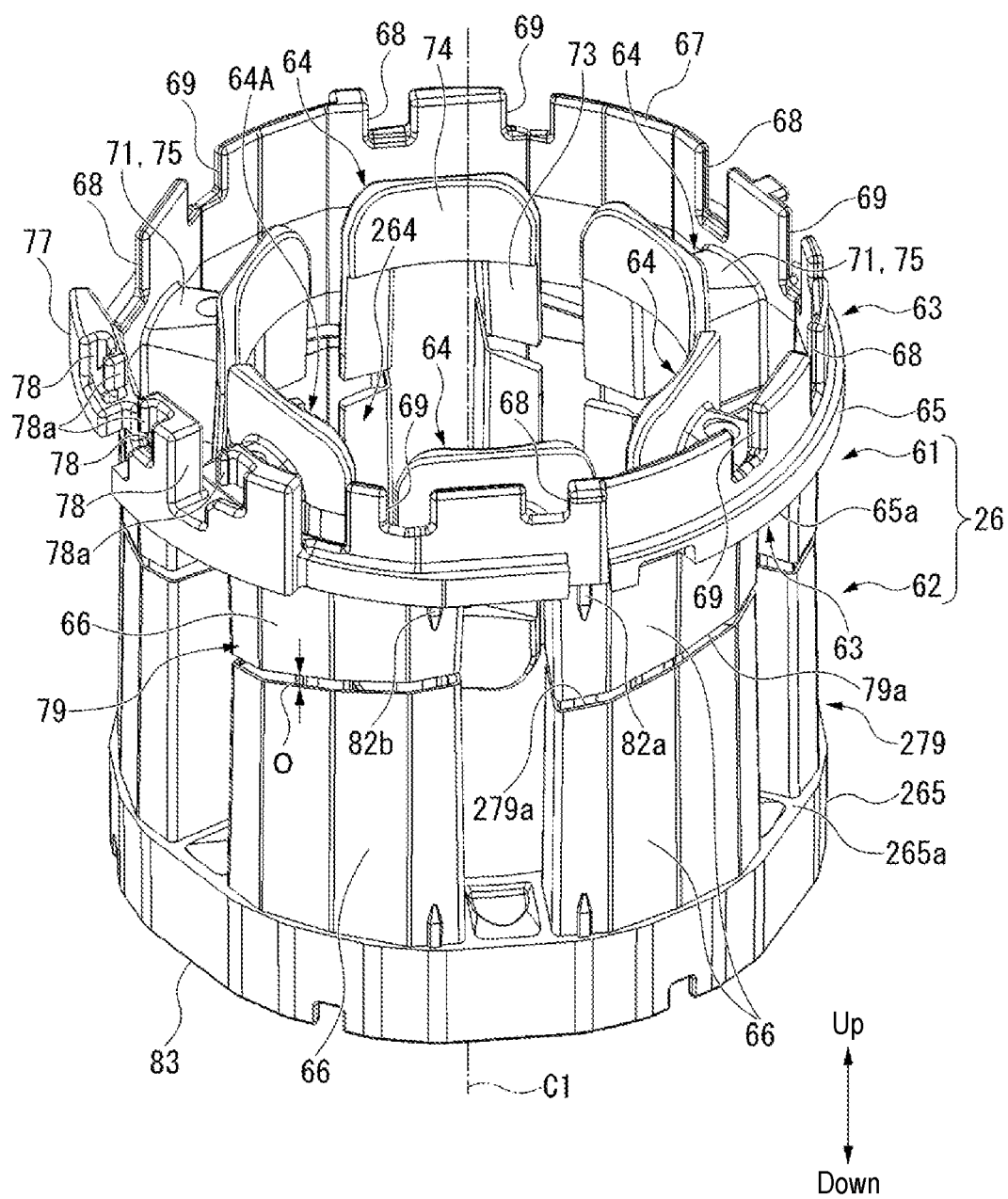
FIG. 6 is a perspective view of an insulator according to the first embodiment of the disclosure.

FIG. 6 is a perspective view of the insulator 26. FIG. 6 shows the insulator 26 in a state of being attached to the stator core 20. The insulator 26 serves to provide insulation between the stator core 20 and the coils 24, and is made of insulating resin.

As shown in FIG. 6, the insulator 26 is divided into two parts in the axial direction so as to be attached from both axial sides of the stator core 20. That is, the insulator 26 includes the first insulator 61 that is attached from one axial side (upper side in FIG. 5) of the stator core 20, and the second insulator 62 that is attached from the other axial side (lower side in FIG. 5) of the stator core 20. In the following, in order to make the description easy to understand, the side of the first insulator 61 is defined as up and the side of the second insulator 62 is defined as down (the same applies to the second embodiment below).

Figure 7:
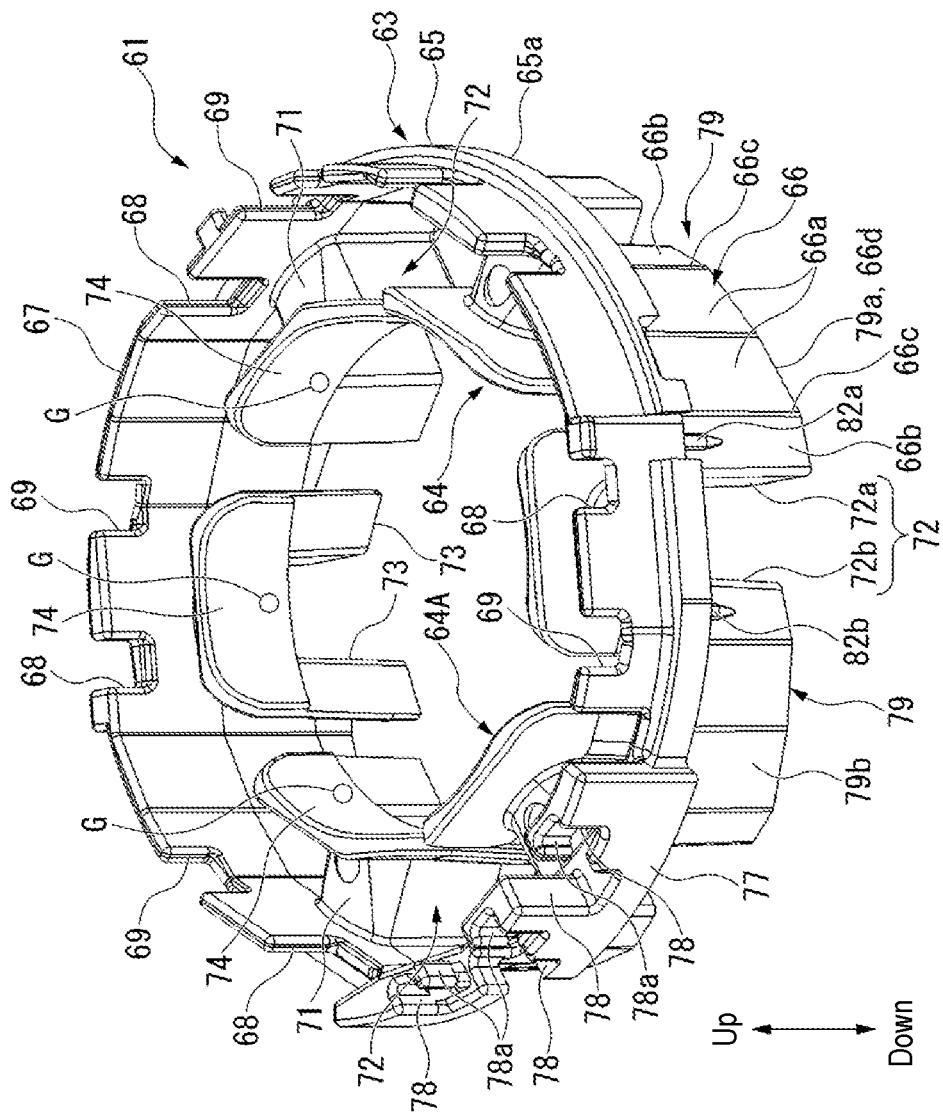
FIG. 7 is a perspective view of a first insulator according to the first embodiment of the disclosure, as viewed from above.

First, the first insulator 61 will be described based on FIG. 5 to FIG. 7. FIG. 7 is a perspective view of the first insulator 61, as viewed from above (the up side). As shown in FIG. 5 to FIG. 7, the first insulator 61 is formed by integrally molding a core body covering portion 63 that covers the core body 21, and tooth covering portions 64 that cover the teeth 22. The core body covering portion 63 includes an annular first core end surface covering portion 65 that covers one axial end surface (an example of the first end surface in the claims) 21a of the core body 21, a core side surface covering portion 66 that protrudes downward from a contact surface 65a of the first core end surface covering portion 65 with the core body 21, and a cylindrical outer wall portion 67 that protrudes upward from the contact surface 65a of the first core end surface covering portion 65.

The core side surface covering portion 66 is arranged on the inner peripheral edge of the first core end surface covering portion 65. The core side surface covering portion 66 is formed along the inner peripheral surface 19 of the core body 21 and covers the inner peripheral surface 19. The core side surface covering portion 66 is formed in a slightly polygonal shape so as to correspond to the shape of the inner peripheral surface 19 of the core body 21. That is, the core side surface covering portion 66 includes two first side surface covering portions 66a that extend from a circumferential center C3 between the tooth covering portions 64 adjacent in the circumferential direction toward the tooth covering portions 64, and two second side surface covering portions 66b that further extend from the first side surface covering portions 66a toward the tooth covering portions 64 and are connected to the tooth covering portions 64.

The angle θ3 between the two first side surface covering portions 66a is the same as the angle θ1 between the two first peripheral surfaces 19a. The angle θ4 between the first side surface covering portion 66a and the second side surface covering portion 66b is the same as the angle θ2 between the first peripheral surface 19a and the second peripheral surface 19b. That is, the angle θ3 between the two first side surface covering portions 66a is greater than the angle θ4 between the first side surface covering portion 66a and the second side surface covering portion 66b. Further, a connecting portion 66c between the first side surface covering portion 66a and the second side surface covering portion 66b is positioned on a straight line S that is parallel to the circumferential side surface 28b of the tooth body 28 and passes through a circumferential end portion 73a of a flange side surface covering portion 73, which will be described later.

The outer wall portion 67 is arranged close to the outer peripheral edge of the first core end surface covering portion 65. The outer peripheral cover portion 88b of the terminal holder 85 is arranged on the radial outer side of the outer wall portion 67. A lead-in slit 68 and a lead-out slit 69 are respectively formed in the outer wall portion 67 at positions corresponding to the respective tooth covering portions 64. The lead-in slit 68 is for leading in the coil 24 from the radial outer side to the radial inner side of the outer wall portion 67. The lead-out slit 69 is for leading out the coil 24 from the radial inner side to the radial outer side of the outer wall portion 67.

The first core end surface covering portion 65 and the outer wall portion 67 are integrally molded with a coil lead-out portion 77 at the root of a tooth covering portion 64A (hereinafter, this tooth covering portion 64A is referred to as a specific tooth covering portion 64A) that covers a specific tooth 22A (see FIG. 4; hereinafter, this tooth 22A is referred to as a specific tooth 22A) among the plurality of teeth 22. The coil lead-out portion 77 is a portion that leads upward the terminal portions 24a (see FIG. 3 and FIG. 4) of the coils 24 of respective phases. The terminal holder 85 is arranged such that the cut-out portion 88c of the terminal holder 85 is fitted into the coil lead-out portion 77. That is, the terminals 86 of the terminal holder 85 are arranged directly above the coil lead-out portion 77.

The coil lead-out portion 77 is formed with a plurality of (for example, three since the coils 24 of the first embodiment have a three-phase structure) coil guide concave portions 78 that regulate separately the lead-out portions of the terminal portions 24a of the coils 24 of respective phases. These coil guide concave portions 78 are collectively arranged side by side in the circumferential direction. Each coil guide concave portion 78 is integrally molded with a coil holding claw 78a that protrudes along the circumferential direction. The terminal portions 24a of the coils 24 of respective phases are separately led out upward via each coil guide concave portion 78. The led-out terminal portions 24a of the coils 24 of each phase are guided to the terminal 86 of the terminal holder 85 while being held by the coil holding claw 78a, and are connected to the terminal 86.

The tooth covering portion 64 includes a tooth end surface covering portion 71 that extends from the first core end surface covering portion 65 along the surface direction of the first core end surface covering portion 65 and is long in the radial direction, tooth side surface covering portions 72 that protrude downward from both circumferential sides (both ends in the lateral direction) of the tooth end surface covering portion 71, flange side surface covering portions 73 that protrude from the radial inner ends of the tooth side surface covering portions 72 to the circumferential outer side, and an inner wall portion 74 that is joined to the radial inner end of the tooth end surface covering portion 71 and the upper ends of the flange side surface covering portions 73 and extends upward from the upper ends of the flange side surface covering portions 73.

The tooth end surface covering portion 71 covers the upper end of the tooth body 28. The tooth side surface covering portion 72 covers the circumferential side surface of the tooth body 28 of the tooth 22. The two tooth side surface covering portions 72 are parallel so as to correspond to the circumferential side surfaces 28b of the tooth body 28. The second side surface covering portions 66b are connected to the radial outer ends of these tooth side surface covering portions 72. The two tooth side surface covering portions 72 are composed of a long tooth side surface covering portion 72a whose longest portion in the axial direction is long, and a short tooth side surface covering portion 72b whose longest portion in the axial direction is shorter than the long tooth side surface covering portion 72a. In the following description, the length of the longest portion in the axial direction of each of the tooth side surface covering portions 72a and 72b is simply referred to as the axial length of each of the tooth side surface covering portions 72a and 72b. The flange side surface covering portion 73 covers the outer peripheral surface of the flange portion 29 of the tooth 22.

These tooth side surface covering portions 72 (long tooth side surface covering portion 72a, short tooth side surface covering portion 72b) and flange side surface covering portions 73 and the core side surface covering portions 66 of the core body covering portion 63 are formed continuously to form a tubular first skirt portion 79 that protrudes downward from the tooth end surface covering portion 71 and the first core end surface covering portion 65. That is, the first skirt portion 79 is interposed in the slots 27 of the stator core 20.

A tip portion 79a which is the lower end of the first skirt portion 79, that is, a tip portion 66d of the core side surface covering portion 66, is formed obliquely so as to smoothly connect the tip portion of the long tooth side surface covering portion 72a and the tip portion of the short tooth side surface covering portion 72b. That is, the tip portion 79a of the first skirt portion 79 (the tip portion 66d of the core side surface covering portion 66) is formed obliquely such that the protruding height from the tooth end surface covering portion 71 and the first core end surface covering portion 65 gradually changes along the circumferential direction. The oblique formation allows the first skirt portion 79 to be gradually inserted into each tooth 22 when the first insulator 61 is attached to the stator core 20. Therefore, the insertability (mountability) of the first insulator 61 to the stator core 20 (teeth 22) is improved.

A pair of press-fit convex portions 82a and 82b are formed close to the tooth side surface covering portions 72 of the core side surface covering portions 66 on an outer side surface 79b of the first skirt portion 79 (the side surfaces of the tooth side surface covering portion 72, the flange side surface covering portion 73, and the core side surface covering portion 66 on the side of the stator core 20). The pair of press-fit convex portions 82a and 82b are arranged on both sides in the circumferential direction with the tooth covering portion 64 interposed therebetween. These press-fit convex portions 82a and 82b are for press-fitting and attaching when attaching the first insulator 61 to the stator core 20. The press-fit convex portions 82a and 82b can prevent the first insulator 61 from coming off from the stator core 20.

The pair of press-fit convex portions 82a and 82b are arranged at equal intervals in the circumferential direction every other tooth covering portion 64, except for the portion corresponding to the specific tooth 22A. In the first embodiment, since there are six teeth 22 (tooth covering portions 64), the pairs of press-fit convex portions 82a and 82b are arranged at portions corresponding to three tooth covering portions 64 which are arranged at equal intervals in the circumferential direction, except for the specific tooth covering portion 64A.

In such a first insulator 61, an injection gate mark G is formed on the inner peripheral surface of each inner wall portion 74. The injection gate mark G is an injection mark of resin formed during injection molding of the first insulator 61.

Figure 8:
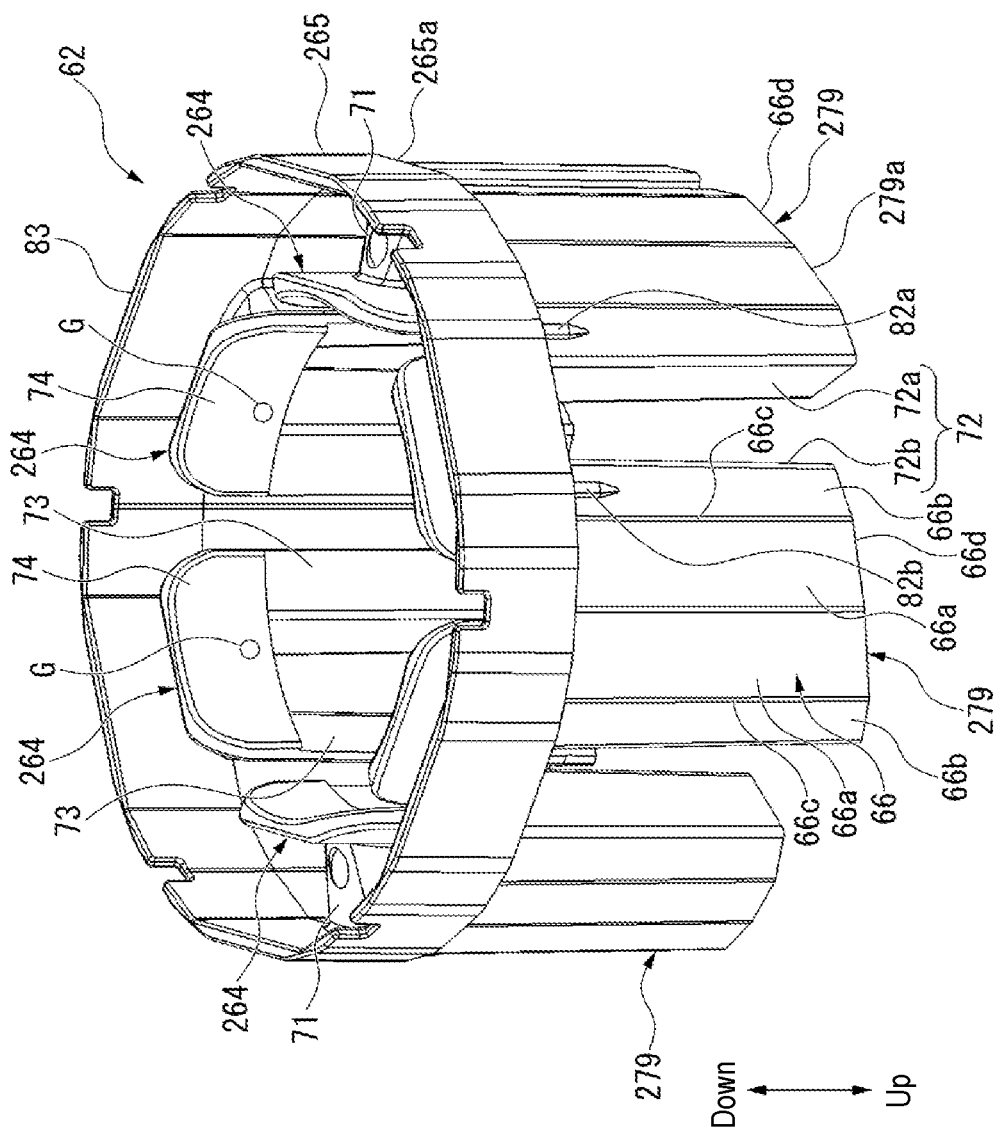
FIG. 8 is a perspective view of a second insulator according to the first embodiment of the disclosure, as viewed from below.

Next, with reference to FIG. 5, the second insulator 62 will be described based on FIG. 6 and FIG. 8. FIG. 8 is a perspective view of the second insulator 62 of the insulator 26, as viewed from below. As shown in FIG. 6 and FIG. 8, the second insulator 62 is substantially line-symmetrical with the first insulator 61 with respect to the axial center (vertical center) of the stator core 20. Thus, the basic configuration of the second insulator 62 is substantially the same as the basic configuration of the first insulator 61. Therefore, in the following description, the same configuration as the first insulator 61 in the second insulator 62 will be given the same name and assigned with the same reference numeral as the first insulator 61, and the description thereof will be omitted. In addition, in order to make the description easy to understand when describing the difference between the second insulator 62 and the first insulator 61, the same configuration as that of the first insulator 61 in the second insulator 62 is basically given the same name and assigned with the same reference numeral.

That is, the second insulator 62 is obtained by integrally molding a core body covering portion 63 that covers the core body 21, and tooth covering portions 264 that cover the teeth 22. The core body covering portion 63 includes an annular second core end surface covering portion 265 that covers the other axial end surface (an example of the second end surface in the claims 21b of the core body 21, a core side surface covering portion 66 that protrudes upward from a contact surface 265a of the second core end surface covering portion 265 with the core body 21, and a cylindrical outer wall portion 83 that protrudes downward from the contact surface 265a of the second core end surface covering portion 265.

The difference between the first insulator 61 and the second insulator 62 lies in that, while the coil lead-out portion 77 is formed in the first core end surface covering portion 65 and the outer wall portion 67 of the first insulator 61, the coil lead-out portion 77 is not formed in the second core end surface covering portion 265 and the outer wall portion 83 of the second insulator 62. That is, the second core end surface covering portion 265 and the outer wall portion 83 have a simple structure in comparison with the first core end surface covering portion 65 and the outer wall portion 67 of the first insulator 61, and have a uniform shape over the entire circumference.

Further, a second skirt portion 279 of the second insulator 62 is composed of the tooth side surface covering portions 72 (the long tooth side surface covering portion 72a and the short tooth side surface covering portion 72b) and the flange side surface covering portion 73, and the core side surface covering portion 66 of the core body covering portion 63. A tip portion 279a of the second skirt portion 279 is formed along the inclination direction of the tip portion 79a of the first skirt portion 79 of the first insulator 61. Therefore, when the first insulator 61 and the second insulator 62 are attached from both axial sides of the stator core 20, the width of a gap O (see FIG. 6) between the tip portion 79a of the first skirt portion 79 and the tip portion 279a of the second skirt portion 279 butted against each other is constant.

The injection gate mark G of the second insulator 62 is also similar to the injection gate mark G of the first insulator 61. That is, in the second insulator 62, the injection gate mark G is formed on the inner peripheral surface of each inner wall portion 74.

The insulator 26 (the first insulator 61 and the second insulator 62) configured in this way forms a coil accommodating concave portion 70 with the second side surface covering portion 66b of the core side surface covering portion 66, the tooth side surface covering portions 72 (the long tooth side surface covering portion 72a and the short tooth side surface covering portion 72b), and the flange side surface covering portion 73. The coils 24 wound around the respective teeth 22 from above the insulator 26 are generally accommodated in the coil accommodating concave portion 70 (see also FIG. 4).

Here, the length of the longest portion of the second skirt portion 279 in the axial direction is greater than the length of the longest portion of the first skirt portion 79 in the axial direction. The longest portions of the first skirt portion 79 and the second skirt portion 279 in the axial direction are the long tooth side surface covering portions 72a. That is, when the axial length of the long tooth side surface covering portion 72a of the first skirt portion 79 is L1, and the axial length of the long tooth side surface covering portion 72a of the second skirt portion 279 is L2, the lengths L1 and L2 satisfy:

$$L2 > L1 \tag{1}$$

In the following description, the length of the longest portion of the first skirt portion 79 in the axial direction is simply referred to as the length L1 of the first skirt portion 79. The length of the longest portion of the second skirt portion 279 in the axial direction is simply referred to as the length L2 of the second skirt portion 279.

Furthermore, it is desirable that the length L1 of the first skirt portion 79 and the length L2 of the second skirt portion 279 satisfy:

$$L2 \geq 1.7 \times L1 \tag{2}$$

The functions and effects of the above formulas (1) and (2) will be described in detail below.

The first insulator 61 and the second insulator 62 are molded by using a mold (not shown) and pouring molten resin into this mold via gates (not shown). These insulators 61 and 62 have sink marks and are slightly deformed due to shrinkage of the resin during curing. In each of the insulators 61 and 62, structurally, the deformation amounts of the skirt portions 79 and 279 extending from the core end surface covering portions 65 and 265 are large.

Here, the first insulator 61 has the coil lead-out portion 77, whereas the second insulator 62 does not have the coil lead-out portion 77. The shape of the first insulator 61 is complicated and non-uniform over the entire circumference due to the presence of the coil lead-out portion 77. In contrast, the shape of the second insulator 62 is simple and uniform over the entire circumference. Therefore, the deformation amount of each first skirt portion 79 of the first insulator 61 is likely to be non-uniform, and the deformation amount itself increases. In contrast, each second skirt portion 279 of the second insulator 62 has a uniform deformation amount, and the deformation amount itself can be kept small. A uniform deformation amount means that the direction of deformation is also uniform.

That is, for example, when the length L1 of the first skirt portion 79 and the length L2 of the second skirt portion 279 are the same (hereinafter, such a case is referred to as the conventional product), not only the deformation amount of the first skirt portion 79 is non-uniform with respect to the second skirt portion 279, but also the deformation amount is large. Thus, by setting the length L1 of the first skirt portion 79 and the length L2 of the second skirt portion 279 to satisfy the above formula (2), the deformation amount of the second insulator 62 is surely greater than the deformation amount of the first insulator 61.

Figure 9:
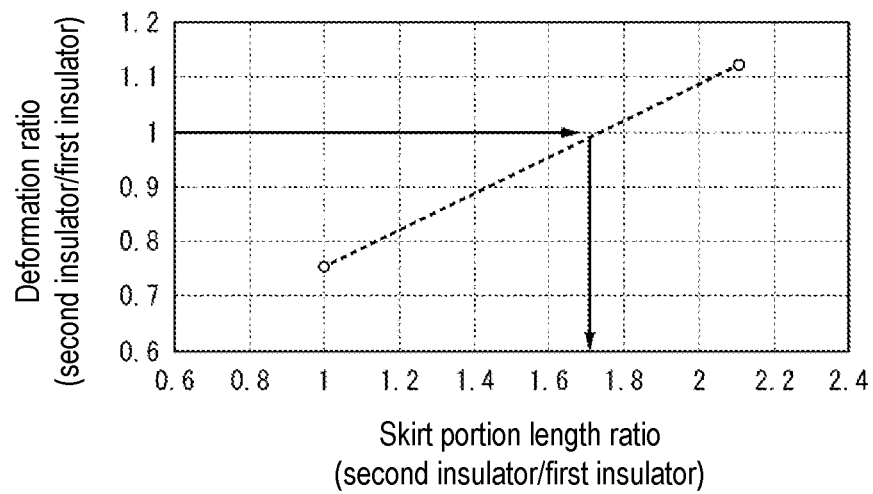
FIG. 9 is a graph showing the change in deformation ratio obtained by dividing the deformation amount of the second insulator by the deformation amount of the first insulator according to the first embodiment of the disclosure.

FIG. 9 is a graph showing the change in deformation ratio when the vertical axis represents the deformation ratio obtained by dividing the deformation amount of the second insulator 62 by the deformation amount of the first insulator 61, and the horizontal axis represents the skirt portion length ratio obtained by dividing the length L2 of the second skirt portion 279 by the length L1 of the first skirt portion 79. As shown in FIG. 9, it can be confirmed that the deformation ratio is 1 or more when the above formula (2) is satisfied. That is, the deformation amount of the second insulator 62 is greater than the deformation amount of the first insulator 61.

Here, as described above, each second skirt portion 279 of the second insulator 62 has a uniform deformation amount. Therefore, even if the deformation amount of the second insulator 62 is set greater than the deformation amount of the first insulator 61, the assemblability of the second insulator 62 to the stator core 20 is improved, as compared with the case where the deformation amount of the first insulator 61 is large. As a result, the assemblability of the insulator 26 as a whole can be improved.

Figure 10:
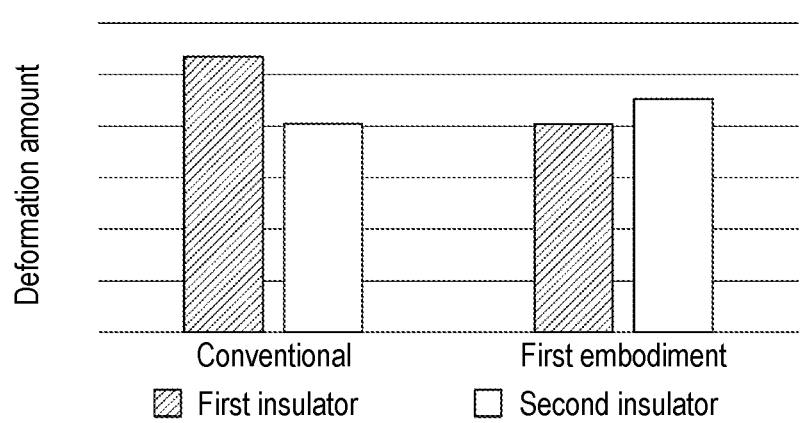
FIG. 10 is a graph comparing the deformation amounts of the insulators in the conventional product and the first embodiment of the disclosure.

FIG. 10 is a graph comparing the deformation amounts of the insulators 61 and 62 of the conventional product and the first embodiment. In addition, the deformation amount shown in FIG. 10 refers to the maximum deformation amount. That is, since in each of the insulators 61 and 62, the portions having the greatest deformation amounts are the skirt portions 79 and 279, the deformation amount shown in FIG. 10 refers to the deformation amount of the portion where the deformation amount is maximum in each of the skirt portions 79 and 279.

As shown in FIG. 10, it can be confirmed that the deformation amount of the first insulator 61 is significantly greater than the deformation amount of the second insulator 62 in the conventional product. Since the deformation amount of each first skirt portions 79 of the first insulator 61 is non-uniform, the assemblability of the first insulator 61 to the stator core 20 deteriorates. The lengths L1 and L2 in the first embodiment shown in FIG. 10 satisfy L2=2.1×L1.

Thus, according to the above-described first embodiment, when the coil lead-out portion 77 is formed only in the first core end surface covering portion 65 (the outer wall portion 67) of the first insulator 61, as the length L2 of the second skirt portion 279 in the second insulator 62 which is not formed with the coil lead-out portion 77 satisfies the above formula (1), the assemblability of the insulator 26 can be improved, as compared with the conventional product. In addition, as a result, the deformation amount of the insulator 26 can be reduced, as compared with the conventional product (see the graph of the first embodiment in FIG. 10). Therefore, the molding accuracy of the insulator 26 can be improved.

Further, as the length L2 of the second skirt portion 279 in the second insulator 62 satisfies the above formula (2), the deformation amount of the second insulator 62 can be made greater than or equal to the deformation amount of the first insulator 61. Therefore, the assemblability and molding accuracy of the insulator 26 can be reliably improved. Furthermore, by setting the lengths L1 and L2 to satisfy L2≤8.2×L1, a length that allows the press-fit convex portions 82a and 82b to be arranged can be secured as the length of the first skirt portion 79.

In the insulator 26 (the first insulator 61 and the second insulator 62) as described above, the injection gate mark G is formed on the inner peripheral surface of each inner wall portion 74. In other words, the injection gate marks G are formed at positions avoiding the skirt portions 79 and 279. That is, the skirt portions 79 and 279 are positioned on the most downstream side in the resin flow direction during injection molding. In such a configuration of the insulator 26, the configuration of the above-described first embodiment can be suitably used.

Since the molding accuracy of the insulator 26 (the first insulator 61 and the second insulator 62) can be improved, it is possible to contribute to Goal 12 of the Sustainable Development Goals (SDGs) led by the United Nations, "Ensure sustainable consumption and production patterns."

Second Embodiment

<Second Insulator>

Figure 11:
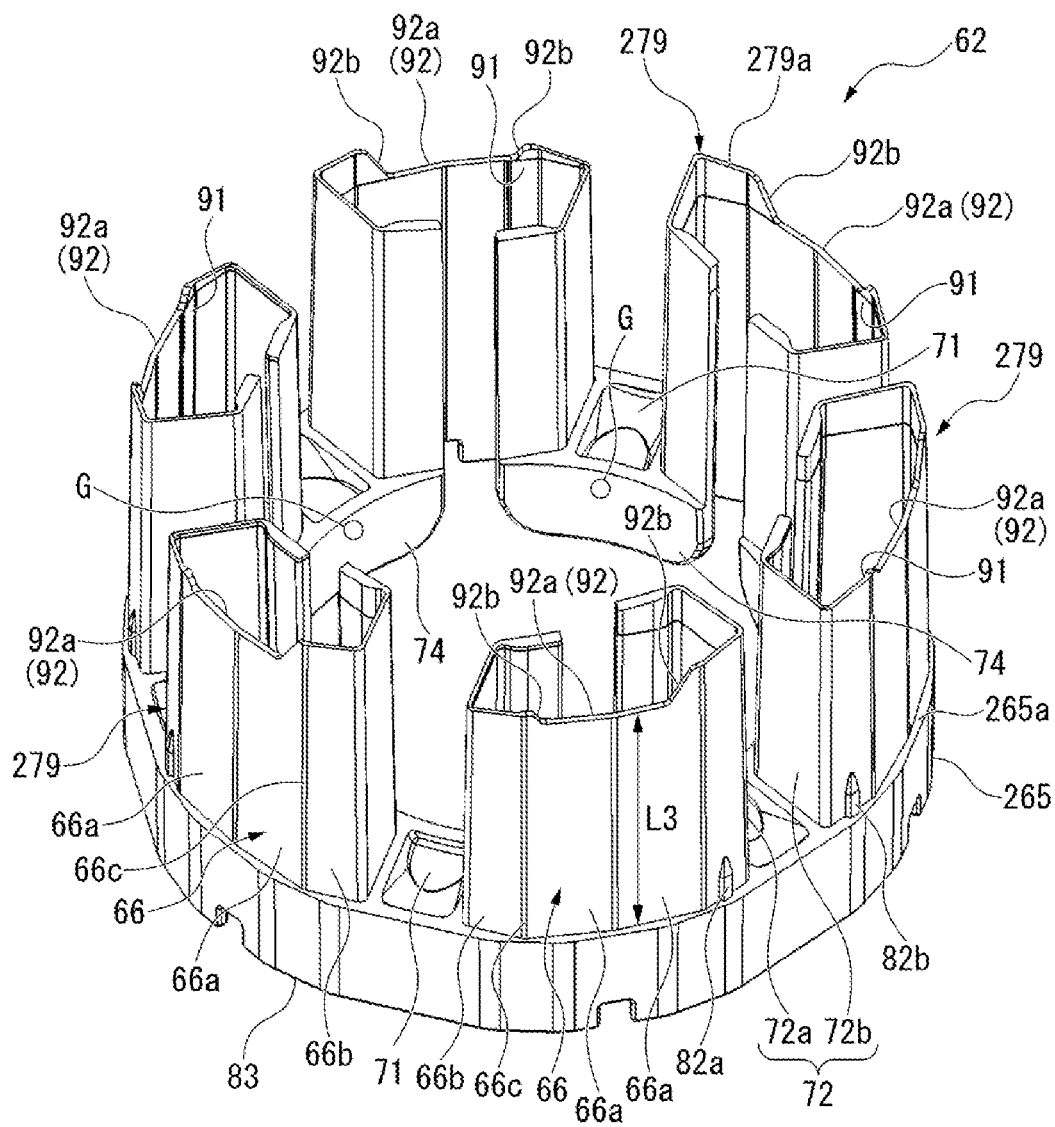
FIG. 11 is a perspective view of a second insulator according to the second embodiment of the disclosure, as viewed from above.
Figure 12:
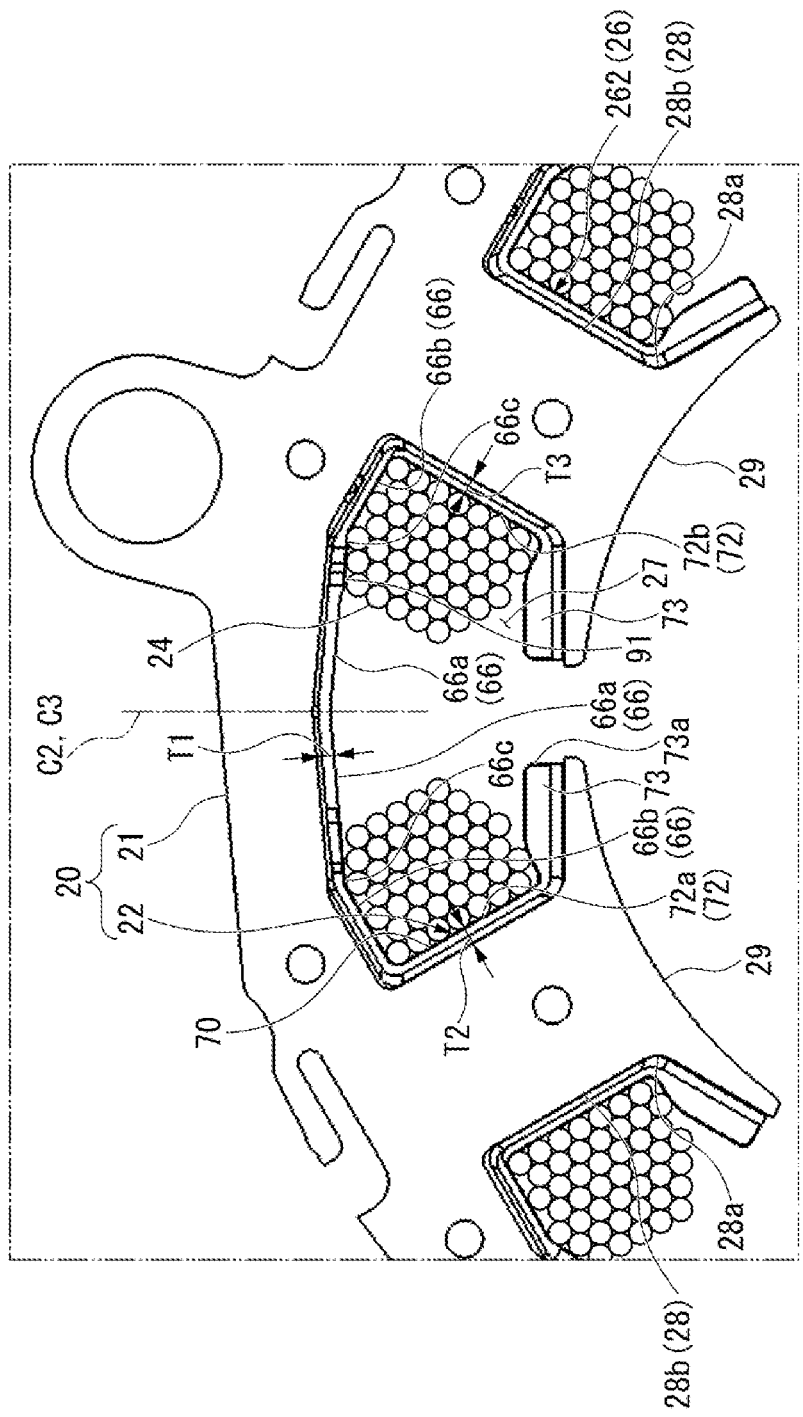
FIG. 12 is a partially enlarged plan view of a stator core with the second insulator attached according to the second embodiment of the disclosure, as viewed from the axial direction.

Next, with reference to FIG. 3, the second embodiment will be described based on FIG. 11 and FIG. 12. The same reference numerals are assigned to the same aspects as the above-described first embodiment, and the description thereof will be omitted. FIG. 11 is a perspective view of a second insulator 262 according to the second embodiment, as viewed from above. FIG. 12 is a partially enlarged plan view of the stator core 20 with the second insulator 262 attached, as viewed from the axial direction.

As shown in FIG. 3, FIG. 11, and FIG. 12, the second embodiment is the same as the above-described first embodiment in that the stator 8 includes a cylindrical stator core 20 whose central axis coincides with the rotation axis C1, an insulator 26 attached to the stator core 20, and a plurality of coils 24 having a three-phase (U-phase, V-phase, and W-phase) structure wound around the stator core 20 from above the insulator 26. The basic configuration of the first insulator 61 and the second insulator 262 in the second embodiment is the same as the basic configuration of the first insulator 61 and the second insulator 62 in the first embodiment described above. The length L2 of the second skirt portion 279 of the second insulator 262 satisfies the above formula (1), preferably the above formula (2), as in the above-described first embodiment.

The difference between the first embodiment and the second embodiment lies in that the shape of the second insulator 62 in the first embodiment and the shape of the second insulator 262 in the second embodiment are different.

Here, the flow of molten resin when forming the insulators 61 and 262 will be described. First, as the injection gate mark G is formed on the inner peripheral surface of each inner wall portion 74, the resin flows from the radial inner side toward the radial outer side. Subsequently, the resin reaches the root of each of the skirt portions 79 and 279 (on the side of each of the core end surface covering portions 65 and 265), and then flows toward the tip portions 79a and 279a.

In such injection molding, when the length L2 of the second skirt portion 279 satisfies the above formula (1), the flow of molten resin to the second skirt portion 279 may deteriorate as the length of the second skirt portion 279 increases. Thus, the second skirt portion 279 is formed as follows.

First, in the second skirt portion 279 of the second insulator 262, when the thickness of the core side surface covering portion 66 is T1, the thickness of the long tooth side surface covering portion 72a of the tooth side surface covering portion 72 is T2, and the thickness of the short tooth side surface covering portion 72b is T3, the thicknesses T1 to T3 satisfy:

$$T1 > T2 > T3 \qquad (3).$$

The reason for the above formula (3) is as follows. That is, in order to improve the insertability (mountability) of the second insulator 62 to the stator core 20, the long tooth side surface covering portion 72a and the short tooth side surface covering portion 72b that have different lengths are provided. As a result, the speed at which the resin is filled into the long tooth side surface covering portion 72a that is long decreases, so T2>T3. As a result of increasing the thickness T2 of the long tooth side surface covering portion 72a, the speed at which the resin is filled into the core side surface covering portion 66 decreases, so T1>T2. Thus, by setting the thicknesses T1 to T3 to satisfy the above formula (3), the resin can be evenly spread over each portion.

Subsequently, in the second skirt portion 279 of the second insulator 262, the connecting portion 66c close to the short tooth side surface covering portion 72b, among the two connecting portions 66c of the core side surface covering portion 66, is formed with a thick portion 91 that is thicker than the other portions of the core side surface covering portion 66. In other words, the thick portion 91 is formed closer to the short tooth side surface covering portion 72b than the circumferential center of the core side surface covering portion 66. The thick portion 91 extends over the entire core side surface covering portion 66 in the axial direction.

The reason for forming the thick portion 91 is as follows. That is, in the configuration of the second skirt portion 279 described above, as the thickness T1 of the core side surface covering portion 66 is increased, the speed at which the resin is filled in the connecting portion 66c close to the short tooth side surface covering portion 72b, among the two connecting portions 66c of the core side surface covering portion 66, decreases. Therefore, by forming the thick portion 91 in the connecting portion 66c close to the short tooth side surface covering portion 72b, among the two connecting portions 66c of the core side surface covering portion 66, the flow path of this connecting portion 66c can be made sufficiently large. Thus, a sufficient speed for filling resin in the connecting portion 66c can be ensured.

Subsequently, the tip portion 279a of the second skirt portion 279 is formed with a concave portion 92 over the two first side surface covering portions 66a. The concave portion 92 is formed to be recessed toward the side of the second core end surface covering portion 265 with respect to the tip portion 279a of the second skirt portion 279. The length L3 from the second core end surface covering portion 265 to a bottom surface 92a of the concave portion 92 and the axial length of the short tooth side surface covering portion 72b are substantially the same length.

Both side surfaces 92b of the concave portion 92 in the circumferential direction are inclined such that the width of the concave portion 92 in the circumferential direction gradually increases toward the tip portion 279a. Corresponding to the formation of the concave portion 92, the length (length L3) of the first side surface covering portion 66a from the second core end surface covering portion 265 at the portion where the concave portion 92 is formed is shortened, and the volume of the second skirt portion 279 is reduced. Therefore, it is possible to prevent short shots from occurring in the second skirt portion 279 during injection molding of the second insulator 262. In addition, since both side surfaces 92b of the concave portion 92 in the circumferential direction are inclined, the resin flows smoothly toward the tip portion 279a of the second skirt portion 279 via the concave portion 92.

As shown in FIG. 12, the coils 24 wound around each tooth 22 from above the insulator 26 (the first insulator 61 and the second insulator 262) are generally accommodated in the coil accommodating concave portion 70 (see also FIG. 4). The position of the thick portion 91 formed in the second insulator 262 is the position of the connecting portion 66c that is the circumferential end portion of the coil accommodating concave portion 70. Therefore, the thick portion 91 hardly affects the space factor of the coils 24. Further, by forming the concave portion 92, the inner peripheral surface 19 of the core body 21 is exposed through where the concave portion 92 is formed. However, the concave portion 92 is formed in the first side surface covering portion 66a that does not constitute the coil accommodating concave portion 70. That is, the number of coils 24 stacked in the first side surface covering portion 66a is small. Therefore, by forming the concave portion 92, it is possible to prevent the insulation between the stator core 20 and the coils 24 from being impaired.

Thus, in the above-described second embodiment, the thickness T1 of the core side surface covering portion 66, the thickness T2 of the long tooth side surface covering portion 72a, and the thickness T3 of the short tooth side surface covering portion 72b of the tooth side surface covering portions 72 in the second skirt portion 279 of the second insulator 262 satisfy the above formula (3). That is, the thickness T1 of the core side surface covering portion 66 is greater than the thicknesses T2 and T3 of the tooth side surface covering portions 72. Therefore, even if the length L2 of the second skirt portion 279 is greater than the length L1 of the first skirt portion 79, the molten flow of the second skirt portion 279 can be improved. Thus, in addition to the same effect as the first embodiment described above, the molding accuracy of the second insulator 262 (the insulator 26) can be further improved.

Furthermore, by setting the thickness T2 of the long tooth side surface covering portion 72a to be greater than the thickness T3 of the short tooth side surface covering portion 72b, the flow of molten resin of the second skirt portion 279 can be further improved.

The thick portion 91 is formed closer to the short tooth side surface covering portion 72b than the circumferential center of the core side surface covering portion 66. The thick portion 91 extends over the entire core side surface covering portion 66 in the axial direction. By forming the thick portion 91 in this way, it is possible to prevent short shots in the second skirt portion 279 during injection molding. More specifically, the thick portion 91 is formed in the connecting portion 66c close to the short tooth side surface covering portion 72b, among the two connecting portions 66c of the core side surface covering portion 66. Therefore, it is possible to prevent the second skirt portion 279 from having a portion where the resin filling speed decreases. Thus, short shots in the second skirt portion 279 during injection molding can be prevented, and the molding accuracy of the second insulator 262 (the insulator 26) can be further improved.

The tip portion 279a of the second skirt portion 279 is formed with the concave portion 92 recessed toward the side of the second core end surface covering portion 265 with respect to the tip portion 279a. Therefore, the length (length L3) of the first side surface covering portion 66a from the second core end surface covering portion 265 at the portion where the concave portion 92 is formed can be reduced, and the volume of the second skirt portion 279 can be reduced. Thus, it is possible to prevent short shots from occurring in the second skirt portion 279 during injection molding of the second insulator 262.

Moreover, the concave portion 92 is formed in the core side surface covering portion 66 (the two first side surface covering portions 66a). Since the number of coils 24 stacked in the core side surface covering portion 66 is small, by forming the concave portion 92, it is possible to prevent the insulation between the stator core 20 and the coils 24 from being impaired, and also prevent the function of the insulator 26 from being impaired. In addition, since both side surfaces 92b of the concave portion 92 in the circumferential direction are inclined, the resin flows smoothly toward the tip portion 279a of the second skirt portion 279 via the concave portion 92. Therefore, the molding accuracy of the second insulator 262 (the insulator 26) can be further improved.

Furthermore, since the space factor of the coils 24 is not affected as the molding accuracy of the second insulator 262 is improved, the torque performance of the electric motor 2 can be improved. Therefore, the energy consumption when driving the electric motor 2 can be suppressed. Accordingly, it is possible to contribute to Goal 7 of the Sustainable Development Goals (SDGs) led by the United Nations, "Ensure access to affordable, reliable, sustainable and modern energy for all."

It should be noted that the disclosure is not limited to the above-described embodiments, and includes various modifications added to the above-described embodiments without departing from the scope of the disclosure. For example, the above-described embodiments illustrate that the motor 1 with the speed reducer is used as the drive source for a wiper device of a vehicle. However, the disclosure is not limited thereto, and the motor 1 with the speed reducer can be applied as various driving devices. It is also possible to adopt only the electric motor 2 having the above-described configuration, in the motor 1 with the speed reducer, in various electric devices.

The above-described embodiments illustrate that the coils 24 of the stator 8 have a three-phase (U-phase, V-phase, and W-phase) structure. However, the number of phases of the coils 24 is not necessarily three.

The above-described embodiments illustrate that the stator core 20 includes the cylindrical core body 21 and a plurality of (six) teeth 22 that protrude from the inner peripheral surface 19 of the core body 21 toward the radial inner side. It is illustrated that the rotor 9 is arranged on the radial inner side of the stator 8 having such a stator core 20. However, the disclosure is not limited thereto, and the stator core 20 may have a configuration in which the teeth 22 protrude from the outer peripheral surface of the core body 21 toward the radial outer side. The rotor 9 may be arranged on the radial outer side of the stator 8 having such a stator core 20. The number of teeth 22 is not necessarily six. The insulator 26 may be formed corresponding to the shape of the stator core 20. Such an insulator 26 can also adopt the above-described configuration.

What is claimed is:

1. An insulator made of resin to be attached to a stator core, which comprises an annular core body and a plurality of teeth protruding from the core body along a radial direction, for providing insulation between the stator core and coils wound around the teeth, the insulator comprising:
   a first insulator and a second insulator to be attached from both axial sides of the stator core,
   wherein the first insulator comprises:
   a first core end surface covering portion covering a first end surface of the core body in an axial direction; and
   a first skirt portion extending in the axial direction from the first core end surface covering portion toward the second insulator and covering a peripheral surface of the core body and circumferential side surfaces of the teeth,
   wherein the second insulator comprises:
   a second core end surface covering portion covering a second end surface of the core body opposite to the first end surface in the axial direction;
   a second skirt portion extending in the axial direction from the second core end surface covering portion toward the first insulator and covering the peripheral surface of the core body and the circumferential side surfaces of the teeth, wherein the second skirt portion comprises a core side surface covering portion covering the peripheral surface of the core body; and
   a concave portion that is formed at a tip portion, opposite to the second core end surface covering portion, of the core side surface covering portion and is recessed toward the second core end surface covering portion with respect to the tip portion,
   wherein the insulator comprises a coil lead-out portion provided integrally only with the first core end surface covering portion for leading out terminal portions of the coils from the first insulator to outside, and
   a length of a longest portion of the second skirt portion in the axial direction is greater than a length of a longest portion of the first skirt portion in the axial direction.

2. The insulator according to claim 1, wherein in a case where the length of the longest portion of the first skirt portion in the axial direction is L1 and the length of the longest portion of the second skirt portion in the axial direction is L2, the length L1 and the length L2 satisfy:

$$L2 \geq 1.7 \times L1.$$

3. The insulator according to claim 1, wherein the second skirt portion further comprises:
   two tooth side surface covering portions respectively covering both circumferential side surfaces of tooth bodies, extending along the radial direction, of the teeth; and
   a flange side surface covering portion covering an outer peripheral surface of a flange portion that is integrally molded with a tooth tip portion, opposite to the core body, of each of the tooth bodies in the radial direction and extends in a circumferential direction,
   wherein a thickness of the core side surface covering portion along a direction perpendicular to the axial direction is greater than a thickness of the tooth side surface covering portion along the direction perpendicular to the axial direction.

4. The insulator according to claim 3, wherein the two tooth side surface covering portions comprise:

a long tooth side surface covering portion whose longest portion in the axial direction is long; and a short tooth side surface covering portion whose longest portion in the axial direction is shorter than the long tooth side surface covering portion, wherein the insulator comprises a thick portion that is formed closer to the short tooth side surface covering portion than a circumferential center of the core side surface covering portion and is thicker than other portions of the core side surface covering portion, and the thick portion extends over the entire core side surface covering portion in the axial direction.

5. The insulator according to claim 4, wherein the two tooth side surface covering portions extend from the core side surface covering portion toward a radial inner side, and the core side surface covering portion comprises:
two first side surface covering portions extending from the circumferential center toward the tooth side surface covering portions adjacent in the circumferential direction; and a second side surface covering portion further extending from the first side surface covering portion toward the tooth side surface covering portion and connected to the tooth side surface covering portion, wherein an angle between the two first side surface covering portions is greater than an angle between the first side surface covering portion and the second side surface covering portion, a connecting portion between the first side surface covering portion and the second side surface covering portion is positioned on a straight line that is parallel to the circumferential side surface of the tooth body and passes through a circumferential end portion of the flange side surface covering portion, and the thick portion is formed at an end portion of the first side surface covering portion on the side of the second side surface covering portion.

6. The insulator according to claim 4, wherein a thickness of the long tooth side surface covering portion is greater than a thickness of the short tooth side surface covering portion.

7. The insulator according to claim 3, wherein the core side surface covering portion comprises:
two first side surface covering portions extending from the circumferential center toward the tooth side surface covering portions adjacent in the circumferential direction; and a second side surface covering portion further extending from the first side surface covering portion toward the tooth side surface covering portion and connected to the tooth side surface covering portion, wherein an angle between the two first side surface covering portions is greater than an angle between the first side surface covering portion and the second side surface covering portion, a connecting portion between the first side surface covering portion and the second side surface covering portion is positioned on a straight line that is parallel to the circumferential side surface of the tooth body and passes through the circumferential end portion of the flange side surface covering portion, and the concave portion is formed in the first side surface covering portion.

8. The insulator according to claim 1, wherein side surfaces of the concave portion in the circumferential direction are inclined such that a width of the concave portion in the circumferential direction gradually increases toward the tip portion.

9. The insulator according to claim 1, comprising a gate mark formed by injecting resin during molding at a position avoiding the first skirt portion and the second skirt portion.

10. A stator, comprising:
the insulator according to claim 1;
a stator core comprising an annular core body to which the insulator is attached, and teeth protruding from a peripheral surface of the core body in a radial direction; and
coils wound around the teeth via the insulator.

11. An electric motor, comprising:
the stator according to claim 10; and
a rotor provided rotatably with respect to the stator.

* * * * *